United States Patent [19]
Damrow et al.

[11] Patent Number: 5,205,968
[45] Date of Patent: Apr. 27, 1993

[54] PROCESS FOR MAKING A MICROPOROUS MEMBRANE FROM A BLEND CONTAINING A POLY(ETHERETHERKETONE)-TYPE POLYMER, AN AMORPHOUS POLYMER, AND A SOLVENT

[75] Inventors: Paul A. Damrow, Walnut Creek; Robert D. Mahoney, Danville; H. Nelson Beck, Walnut Creek; Mark F. Sonnenschein, Antioch, all of Calif.

[73] Assignee: The Dow Chemical Company, Midland, Mich.

[21] Appl. No.: 636,633

[22] Filed: Dec. 28, 1990

Related U.S. Application Data

[63] Continuation-in-part of Ser. No. 380,058, Jul. 14, 1989, Pat. No. 5,064,580, which is a continuation-in-part of Ser. No. 175,716, Mar. 31, 1988, Pat. No. 4,904,426.

[51] Int. Cl.$^5$ .............................................. B29C 67/20
[52] U.S. Cl. ................... 264/28; 210/500.27; 210/500.28; 210/500.41; 264/41; 264/184; 264/203; 264/210.3; 264/210.4; 264/210.6; 264/211.18; 264/211.19; 264/211.2; 264/216; 264/235; 264/235.6; 264/346
[58] Field of Search ............... 264/41, 184, 203, 209.1, 264/211.14, 211.16, 211.19, 28, 210.3, 210.4, 210.6, 211.18, 211.8, 216, 235, 235.6, 346; 210/500.23, 500.27, 500.21, 500.28, 500.41

[56] References Cited

U.S. PATENT DOCUMENTS

| | | | |
|---|---|---|---|
| 3,637,592 | 1/1972 | Berr | 260/47 R |
| 3,928,295 | 12/1975 | Rose | 260/79.3 M |
| 4,051,300 | 9/1977 | Klein et al. | 264/49 |
| 4,100,238 | 7/1978 | Shinomura | 264/49 |
| 4,118,363 | 10/1978 | Smith | 524/371 |
| 4,320,224 | 3/1982 | Rose et al. | 528/126 |
| 4,331,798 | 5/1982 | Staniland | 528/371 |
| 4,377,481 | 3/1983 | Jakabhazy | 264/41 |
| 4,387,187 | 6/1983 | Newton | 525/409 |
| 4,419,486 | 12/1983 | Rose | 525/534 |
| 4,456,740 | 6/1984 | Holubka et al. | 525/528 |
| 4,540,684 | 9/1985 | Stoltefuss et al. | 514/32 |
| 4,664,681 | 5/1987 | Anazawa et al. | 264/176.1 |
| 4,678,833 | 7/1987 | McCreedy et al. | 525/66 |
| 4,711,945 | 12/1987 | Daniels | 528/219 |
| 4,714,725 | 12/1987 | Hendy et al. | 524/108 |
| 4,721,732 | 1/1988 | Dubrow et al. | 521/62 |
| 4,798,847 | 1/1989 | Roesink et al. | 521/50 |
| 4,804,472 | 2/1989 | Handlin, Jr. | 264/216 |
| 4,820,419 | 4/1989 | Hendy et al. | 210/651 |
| 4,882,223 | 11/1989 | Aptel et al. | 428/398 |
| 4,904,426 | 2/1990 | Lundgard et al. | 264/41 |
| 4,957,817 | 9/1990 | Chau et al. | 264/45.9 |
| 4,964,890 | 10/1990 | Reuter et al. | 55/158 |
| 5,064,580 | 11/1991 | Beck | 264/41 |

FOREIGN PATENT DOCUMENTS

| | | |
|---|---|---|
| 2020845 | 1/1991 | Canada . |
| 0192408 | 8/1986 | European Pat. Off. . |
| 224236 | 6/1987 | European Pat. Off. . |
| 0254431 | 1/1988 | European Pat. Off. . |
| 297744 | 1/1989 | European Pat. Off. . |
| 409496 | 1/1991 | European Pat. Off. . |
| 3402471 | 8/1985 | Fed. Rep. of Germany . |
| T52404 | 7/1990 | Hungary . |
| 62-095104 | 5/1987 | Japan . |
| 2180790 | 4/1987 | United Kingdom . |

OTHER PUBLICATIONS

Bishop et al., "Solubility and Properties of a Poly(aryl ether ketone) in Strong Acids," *Macromolecules*, vol. 18, American Chemical Society, 1985, pp. 86-93.

(List continued on next page.)

*Primary Examiner*—Leo B. Tentoni

[57] ABSTRACT

The invention relates to a process for preparing a microporous membrane from an unsulfonated poly(etheretherketone)-type polymer by forming a mixture of an unsulfonated poly(etheretherketone)-type polymer, an amorphous polymer, and a plasticizer, heating the resulting mixture, extruding or casting the mixture into a membrane, quenching or coagulating the membrane, and leaching the membrane, while optionally drawing the membrane before, during, and/or after leaching.

23 Claims, 1 Drawing Sheet

OTHER PUBLICATIONS

Lovinger et al., "Solution Crystallization of Poly(ether ether ketone)," *Macromolecules*, vol. 19, American Chemical Society, 1986, pp. 1861–1867.

Jin et al., "A Sulphonated Poly(aryletherketone)," Department of Polymer Science and Engineering, University of Massachusetts, 1984.

Atwood et al., "Synthesis And Properties Of Polyaryletherketones," *ACS Polymer Preprints*, 20(1), 1979, pp. 191–194.

Dr. Klaus Dahl (Raychem Corporation), "Heat Resistant Semicrystalline Poly(phenylene ether ketones): Melt Processable High Performance Polymers," *Industrial Affiliates Symposium on High Performance Polymers*, Department of Chemistry and Chem. Eng., Stanford University, Dec. 3–5, 1986.

Victrex PEEK Product Brochure, "A Guide To Grades For Injection Moulding," *ICI Advanced Materials*, 1986.

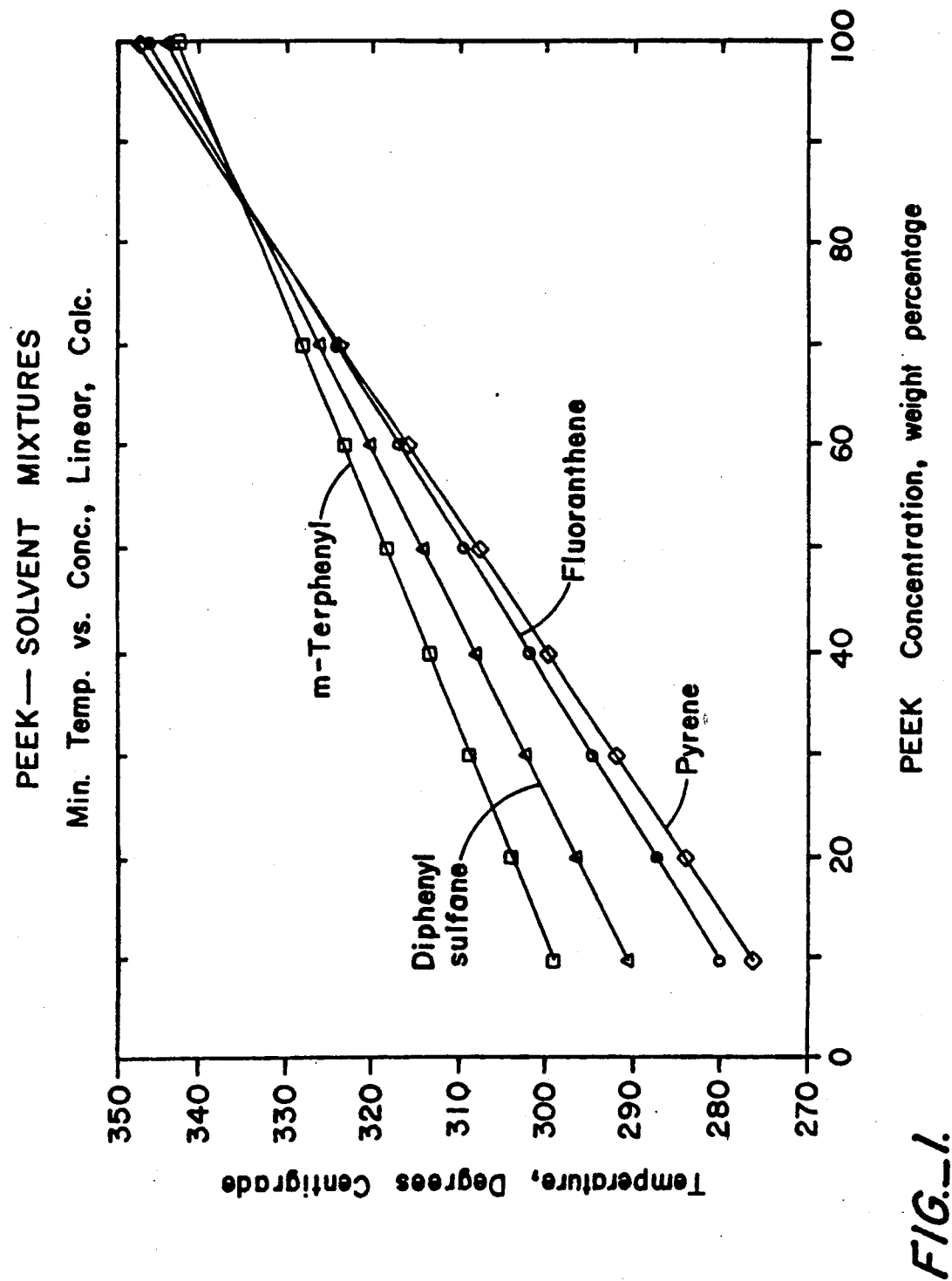

PROCESS FOR MAKING A MICROPOROUS MEMBRANE FROM A BLEND CONTAINING A POLY(ETHERETHERKETONE)-TYPE POLYMER, AN AMORPHOUS POLYMER, AND A SOLVENT

CROSS REFERENCE TO CO-PENDING PATENT APPLICATION

This application is a continuation-in-part of U.S. patent application Ser. No. 07/380,058, filed Jul. 14, 1989 now U.S. Pat. No. 5,064,580, which in turn is a continuation-in-part of U.S. patent application Ser. No. 175,716, filed Mar. 31, 1988, now U.S. Pat. No. 4,904,426.

BACKGROUND OF THE INVENTION

This invention relates to a process for preparing microporous membranes from a blend containing an unsulfonated poly(etheretherketone)-type polymer, an amorphous polymer, and a solvent and optional non-solvent. Such membranes are useful in the treatment of liquids by the membrane separation processes of ultrafiltration, microfiltration, depth filtration, macrofiltration, membrane distillation, and membrane stripping. The membranes of this invention are also useful as microporous supports for composite liquid and/or gas separation membranes.

In the past, microporous membranes have been fabricated from polyolefins such as polyethylene and polypropylene. One typical method of preparing such polyolefin membranes is by an extrusion process which involves dissolving the polyolefin in a solvent or a mixture of solvent and non-solvent, extruding the polyolefin/solvent/non-solvent mixture into membranes, and immersing the membranes into a leach bath. Another method of preparing such polyolefin membranes is by a melt-extrusion process which involves extruding the membranes from the molten polyolefin, followed by cold drawing the membranes. However, polyolefins, while inexpensive and easy to process, exhibit relatively low heat distortion temperatures.

Poly(etheretherketone)-type polymers are high performance thermoplastics which possess high glass transition temperatures, high crystalline melting points, high thermal stability, and high solvent resistance. Such properties make poly(etheretherketone)-type polymers useful for membranes employed in liquid separations, particularly membrane separation processes which involve treatment of organic, acidic, or basic liquids at elevated temperatures.

The very properties which make poly(etheretherketone)-type polymers desirable materials for use in applications which require high temperature and/or solvent resistance also render such polymers very difficult to process into membranes, particularly since poly(etheretherketone)-type polymers exhibit relatively low solution viscosities at the high membrane fabrication temperatures, in excess of about 250° C., frequently required to fabricate membranes. The low solution viscosities exhibited by poly(etheretherketone)-type polymers are particularly problematic with extrusion or casting blends containing less than about the 40 weight percent polymer required to produce high flux microporous membranes. Such low solution viscosities also render extrusion of hollow fiber microporous membranes from poly(etheretherketone)-type polymers especially difficult.

Furthermore, poly(etheretherketone)-type polymers are extremely solvent resistant and are therefore considered to be insoluble in all common solvents. Therefore, to form membranes, poly(etheretherketone), for example, is typically dissolved in very strong organic acids such as concentrated sulfuric acid to sulfonate the poly(etheretherketone), which renders the sulfonated poly(etheretherketone) soluble in common solvents such as dimethylformamide and dimethylacetamide. The problem associated with such a process is that the fabricated membrane comprises not poly(etheretherketone), but rather sulfonated poly(etheretherketone), which is soluble in common solvents. Thus the high solvent resistance of poly(etheretherketone) is lost.

What is needed is a process of preparing microporous membranes from unsulfonated poly(etheretherketone)-type polymers using plasticizers, that is, solvents and optional non-solvents, which do not chemically modify or degrade the unsulfonated poly(etheretherketone)-type polymer during fabrication so that the high strength, temperature resistance, and solvent resistance of the unsulfonated poly(etheretherketone)-type polymer is retained by the fabricated membranes. What is further needed is a method of increasing the solution viscosities of the poly(etheretherketone)-type polymers, so that membranes can be more easily fabricated at the high temperatures required to fabricate membranes from such polymers, while retaining the high temperature and solvent resistance of the unsulfonated poly(etheretherketone)-type polymer. What is especially needed is a process for preparing microporous membranes having high flux from unsulfonated poly(etheretherketone)-type polymers.

SUMMARY OF THE INVENTION

The invention is a process for preparing a microporous membrane from an unsulfonated poly(etheretherketone)-type polymer which comprises the steps of:
A. forming a mixture comprising:
  (i) at least one unsulfonated poly(etheretherketone)-type polymer,
  (ii) a plasticizer comprising at least one organic compound capable of dissolving at least about 10 weight percent of said poly(etheretherketone)-type polymer at the extrusion or casting temperature, and
  (iii) at least one amorphous polymer which is stable at elevated temperatures, which possesses a glass transition temperature of at least about −100° C., and which is at least partially immiscible in said poly(etheretherketone)-type polymer in the presence of said plasticizer;
B. heating said mixture to a temperature at which said mixture becomes a fluid;
C. extruding or casting said fluid under conditions such that a membrane is formed;
D. quenching or coagulating said membrane by passing said membrane through at least one quench or coagulation zone under conditions such that said membrane solidifies; and
E. leaching said membrane by passing said membrane through at least one leach zone under conditions such that at least a portion of said plasticizer for said unsulfonated poly(etheretherketone)-type polymer, at least a portion of said amorphous polymer, or a combination thereof, is removed from said membrane; and
optionally, before leaching, during leaching, after leaching, or a combination thereof, drawing said membrane to increase the flux of fluid through said membrane while said membrane is at a temperature above about 25° C. and below the crystalline melting point of the poly(etheretherketone)-type polymer or the depressed melting point of the poly(etheretherketone)-type polymer and plasticizer mixture.

The membranes of this invention exhibit excellent solvent and temperature resistance. The membranes also possess high tensile strength. The membranes are useful as microporous membranes for liquid separations such as ultrafiltration, microfiltration, depth filtration, macrofiltration, membrane stripping, and membrane distillation and as microporous supports for composite liquid or gas separation membranes.

BRIEF DESCRIPTION OF THE DRAWING

FIG. 1 illustrates a composite of temperature at ambient pressure at which a specific weight percent of PEEK will dissolve in the solvents m-terphenyl, pyrene, fluoranthene, and diphenylsulfone.

DETAILED DESCRIPTION OF THE INVENTION

Poly(etheretherketone)-type polymers refer to polymers containing predominantly ether, —R—O—R—, and ketone, —R—CO—R—, linkages, wherein R is a divalent aromatic group. R is preferably a substituted or unsubstituted phenylene of Formula 1:

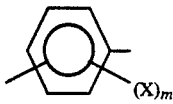

Formula 1 wherein
X is independently in each occurrence hydrogen, a $C_{1-4}$ alkyl, or a halogen; and
m is an integer between 0 and 4 inclusive.
X is preferably hydrogen, methyl, ethyl, chlorine, bromine, or fluorine.

Examples of preferred poly(etheretherketone)-type polymers within the scope of this invention include poly(etherketone) (PEK), poly(aryletherketone) (PAEK), poly(etheretherketone) (PEEK), poly(etherketoneketone) (PEKK), poly(etheretheretherketone) (PEEEK), poly(etheretherketoneketone) (PEEKK), poly(etherketoneetherketoneketone) (PEKEKK), and mixtures thereof.

An especially preferred poly(etheretherketone)-type polymer for use in this invention is PEEK, that is, poly(oxy-p-phenyleneoxy-p-phenylenecarbonyl-p-phenylene). PEEK is comprised of the repeat units described in Formula 2:

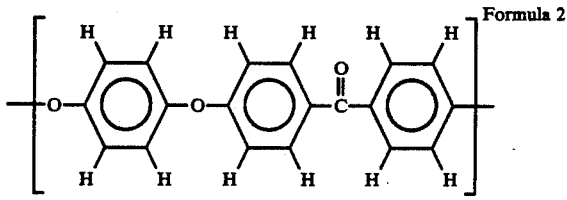

Formula 2

Another especially preferred poly(etheretherketone)-type polymer for use in this invention is PEK, that is, poly(oxy-1,4-phenylenecarbonyl-1,4-phenylene). PEK is comprised of the repeat units described in Formula 3:

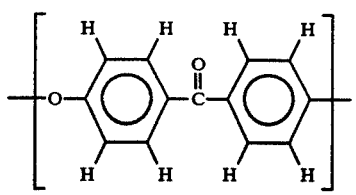

Formula 3

The poly(etheretherketone)-type polymers useful in this invention are unsulfonated. The poly(etheretherketone)-type polymers from which the membranes are fabricated preferably possess a degree of crystallinity of at least about 10 percent, more preferably of at least about 20 percent, even more preferably of at least about 30 percent, and a melting point of at least about 190° C., more preferably of at least about 250° C.

Commercially available PEEK, for example, VICTREX® PEEK 450 (®trademark of ICI Americas, Inc.), possesses a glass transition temperature of about 143° C. and a melting point of about 334° C. Such commercially available PEEK possesses a tensile strength of about 13,300 psi (ASTM Test Method D638), an elongation at break of about 50 percent (ASTM Test Method D638 at about 23° C. and test speed of about 0.2 in./min.), an ultimate shear strength of about 13,800 psi (ASTM Test Method D3846), a shear modulus of 188,500 psi (at about 23° C.), and a tensile modulus (1 percent secant) of about 522,100 psi (ASTM Test Method D638 at about 23° C.). The synthesis of such polymers is known in the art. See U.S. Pat. Nos. 4,320,224 and 4,331,798, the relevant portions incorporated herein by reference.

The amorphous polymers useful in this invention are at least partially immiscible with the poly(etheretherketone)-type polymer in the presence of a plasticizer. In the art generally, some ternary systems containing two polymers and a plasticizer comprising a solvent and optional non-solvent may form a single phase or two coexisting phases, depending upon the relative proportions of the components in the system. The term compatibility is often used in the art in a thermodynamic sense to be synonymous with miscibility. Solution methods are commonly used to determine the miscibility of mixtures of two polymers in a solvent and optional non-solvent. One method of determining miscibility is to mix two polymers and a solvent and optional non-solvent. On standing for a few days, the polymers are considered miscible if phase separation does not occur; if phase separation does occur, the two polymers are said to be immiscible. In the present invention, the relative concentrations of the poly(etheretherketone)-type polymer, the amorphous polymer, and the plasticizer comprising solvent and optional non-solvent in the mixture must be such that the resulting ternary mixture is immiscible, that is, physically a multiphase system, at the membrane fabrication temperature. See C. Olabisi, "Polyblends," *Encycl. of Chem. Tech.*, 3rd Ed., Interscience, New York, N.Y., Vol. 18, p. 443 (1982); H. Tompa, "Polymer Solutions," Academic Press, New York, N.Y., pp. 200–201 (1959); J. Hildebrand et al., "The Solubility of Non-Electrolytes," 3rd Ed., Rheinhold Publishing, New York, N.Y., pp. 382–383 (1950); D. R. Paul, "Interfacial Agents (Compatibilizers) For Polymer Blends," *Polymer Blends*, Vol. 2, Academic Press, New York, N.Y., pp. 35–36 (1978); P. J. Flory, "Principals of Polymer Chemistry," Cornell University Press, Ithaca, N.Y., pp. 554–559 (1953); H. Morawetz, "Macromolecules in Solution," Interscience Publishing, New York, N.Y., pp. 85–88 (1965); the relevant portions incorporated herein by reference.

The amorphous polymers useful in this invention are stable at the elevated temperatures required for fabricating the membrane. The amorphous polymers are stable at temperatures preferably above about 200° C., more preferably above about 250° C., even more preferably above about 300° C. Stable at elevated temperatures means that the amorphous polymers do not undergo substantial degradation at the membrane fabrication temperature. The amorphous polymers useful in this invention preferably possess a glass transition temperature of at least about −100° C., more preferably of at least about −80° C., even more preferably of at least about −60° C. The amorphous polymers useful in this invention preferably possess a molecular weight preferably of at least about 500, more preferably of at least about 1,000. The amorphous polymers useful in this invention possess a molecular weight preferably of less than about $4 \times 10^6$, more preferably of less than about $3 \times 10^6$, even more preferably of less than about $1 \times 10^6$.

Preferred amorphous polymers for use in this invention include polysulfones; polyethersulfones; styrene copolymers, such as styrene-acrylonitrile copolymer and styrene-maleic anhydride copolymer; amorphous cellulose esters such as cellulose acetate butyrate and cellulose acetate propionate; amorphous ethylene copolymers; amorphous polyesters; amorphous cellulose ethers such as ETHOCEL ® ethyl cellulose resin and METHOCEL ® methyl cellulose resin (®trademarks of The Dow Chemical Company); polycarbonates; polystyrenes; polysiloxanes; polyacrylates; polymethacrylates; poly(vinylacetates); and polyacrylamides. More preferred amorphous polymers include polysulfones, polyethersulfones, amorphous polyesters, and polycarbonates.

The plasticizers useful in this invention comprise at least one organic compound preferably capable of dissolving at least about 10 weight percent of the poly(etheretherketone)-type polymer present at the membrane fabrication temperature. The plasticizer more preferably dissolves at the fabrication temperature at least about 25 weight percent of the poly(etheretherketone)-type polymer and even more preferably about 50 weight percent of the poly(etheretherketone)-type polymer. The plasticizer may be comprised of a solvent for the poly(etheretherketone)-type polymer or a mixture of a solvent and non-solvent for the poly(etheretherketone)-type polymer, provided the solvent and non-solvent mixture itself is capable of dissolving at least about 10 weight percent of the poly(etheretherketone)-type polymer at the membrane fabrication temperature. A solvent for the poly(etheretherketone)-type polymer dissolves at least about 10 weight percent poly(etheretherketone)-type polymer at the membrane fabrication temperature. A non-solvent for the poly(etheretherketone)-type polymer dissolves less than about 10 weight percent of the poly(etheretherketone)-type polymer at the membrane fabrication temperature.

A preferred class of solvents useful in this invention are organic compounds consisting predominantly of carbon and hydrogen and optionally oxygen, nitrogen, sulfur, halogen, and mixtures thereof, wherein the organic compound has a molecular weight of between about 160 and about 450, contains at least one six-membered aromatic ring structure, and possesses a boiling point of between about 150° C. and about 480° C.

Preferred solvents useful in this invention include diphenic acid, N,N-diphenylformamide, benzil, anthracene, 1-phenylnaphthalene, 4-bromobiphenyl, 4-bromodiphenylether, benzophenone, 1-benzyl-2-pyrrolidinone, o,o'-biphenol, phenanthrene, triphenylmethanol, triphenylmethane, triphenylene, 1,2,3-triphenylbenzene, diphenylsulfone, 2,5-diphenyloxazole, 2-biphenylcarboxylic acid, 4-biphenylcarboxylic acid, m-terphenyl, 4-benzoylbiphenyl, 2-benzoylnaphthalene, 3-phenoxybenzyl alcohol, fluoranthene, 2,5-diphenyl-1,3,4-oxadiazole, 9-fluorenone, 1,2-dibenzoylbenzene, dibenzoylmethane, p-terphenyl, 4-phenylphenol, 4,4'-dibromobiphenyl, diphenylphthalate, 2,6-diphenylphenol, phenothiazine, 4,4'-dimethoxybenzophenone, 9,10-diphenylanthracene, pentachlorophenol, pyrene, 9,9'-bifluorene, a mixture of terphenyls, for example, SANTOWAX R ® mixed terphenyls (®trademark of the Monsanto Company), a mixture of partially hydrogenated terphenyls, for example, THERMINOL 66 ® partially hydrogenated terphenyls (®trademark of the Monsanto Company), a mixture of terphenyls and quaterphenyls, for example, THERMINOL 75 ® mixed terphenyls and quaterphenyls (trademark of the Monsanto Company), 1-phenyl-2-pyrrolidinone, 4,4'-isopropylidenediphenol, 4,4'-dihydroxybenzophenone, quaterphenyl, diphenylterephthalate, 4,4'-dimethyldiphenylsulfone, 3,3'4,4'-tetramethldiphenylsulfone, and mixtures thereof. Not all of these solvents are equally effective with all poly(etheretherketone)-type polymers. One of ordinary skill in the art can readily select the best solvent for a specific polymer empirically.

More preferred solvents include N,N-diphenylformamide, benzil, anthracene, 1-phenylnaphthalene, 4-bromobiphenyl, 4-bromodiphenyl ether, benzophenone, 1-benzyl-2-pyrrodidinone, o,o'-biphenol, phenanthrene, triphenylmethanol, triphenylmethane, triphenylene, 1,2,3-triphenylbenzene, diphenylsulfone, 2,5-diphenyloxazole, 2-biphenylcarboxylic acid, 4-biphenylcarboxylic acid, m-terphenyl, 4-benzoylbiphenyl, 2-benzoylnaphthalene, 3-phenoxybenzyl alcohol, fluoranthene, 2,5-diphenyl-1,3,4-oxadiazole, 9-fluorenone, 1,2-dibenzoylbenzene, dibenzoylmethane, p-terphenyl, 4-phenylphenol, 4,4'-dibromobiphenyl, diphenylphthalate, 2,6-diphenylphenol, phenothiazine, 4,4'-dimethoxybenzophenone, 9,10-diphenylanthracene, pentachlorophenol, pyrene, 9,9'-bifluorene, a mixture of terphenyls, for example, SANTOWAX R ® mixed terphenyls (®trademark of the Monsanto Company), a mixture of partially hydrogenated terphenyls, for example, THERMINOL 66 ® partially hydrogenated terphenyls (®trademark of the Monsanto Company), a mixture of terphenyls and quaterphenyls, for example, THERMINOL 66 ® mixed terphenyls and quaterphenyls (®trademark of the Monsanto Company), 1-phenyl-2-pyrrolidinone, 4,4'-isopropylidenediphenol, 4,4' -dihdroxybenzophenone, quaterphenyl, diphenylterephthalate, 4,4'-dimethyldiphenylsulfone, 3,3'4,4'-tetramethyldiphenylsulfone, and mixtures thereof.

Even more preferred solvents include triphenylmethanol, triphenylmethane, triphenylene, 1,2,3-triphenylbenzene, diphenylsulfone, 2,5-diphenyloxazole, 2-biphenylcarboxylic acid, 4-biphenylcarboxylic acid, m-terphenyl, 4-benzoylbiphenyl, 2-benzoylnaphthalene, 3-phenoxybenzyl alcohol, fluoranthene, 2,5-diphenyl-1,3,4-oxadiazole, 9-fluorenone, 1,2-dibenzoyl benzene, dibenzoylmethane, p-terphenyl, 4-phenylphenol, 4,4'-dibromobiphenyl, diphenylphthalate, 2,6-diphenylphenol, phenothiazine, 4,4'-dimethoxybenzophenone, 9,10diphenylanthracene, pentachlorophenol, pyrene, 9,9'-bifluorene, a mixture of terphenyls, for example, SANTOWAX R ® mixed terphenyls (®trademark of the Monsanto Company), a mixture of partially hydrogenated terphenyls, for example, THERMINOL 66 ® partially hydrogenated terphenyls (®trademark of the Monsanto Company), a mixture of terphenyls and quaterphenyls, for example, THERMINOL 75 ® mixed terphenyls and quaterphenyls (®trademark of the Monsanto Company), 1-phenyl-2-pyrrolidinone, 4,4'-isopropylidenediphenol, 4,4'-dihydroxybenzophenone, quaterphenyl, diphenylterephthalate, 4,4'-dimethyldiphenylsulfone, 3,3'4,4'-tetramethyldiphenylsulfone, and mixtures thereof.

Especially preferred solvents include m-terphenyl, p-terphenyl, a mixture of terphenyls, for example, SANTOWAX R ® mixed terphenyls (®trademark of the Monsanto Company), a mixture of partially hydrogenated terphenyls, for example, THERMINOL 66 ® partially hydrogenated terphenyls (®trademark of the Monsanto Company), a mixture of terphenyls and quaterphenyls, for example, THERMINOL 75 ® mixed terphenyls and quaterphenyls (®trademark of the Monsanto Company), quaterphenyl, diphenylsulfone, and mixtures thereof.

A preferred class of non-solvents useful in this invention are organic compounds consisting predominantly of carbon and hydrogen and optionally oxygen, phosphorus, silicon, nitrogen, sulfur, halogen, and mixtures thereof, wherein the organic compound has a molecular weight of between about 120 and about 455, and possesses a boiling point of between about 150° C. and about 480° C. The non-solvents more preferably have a boiling point of between about 280° C. and about 480° C., even more preferably between about 300° C. and about 480° C. The non-solvents preferably are soluble in the solvent used at elevated temperatures.

Preferred non-solvents useful in this invention include 1,3,5-triphenylbenzene, tetraphenylmethane, tetraphenylsilane, diphenylsulfoxide, 1,1-diphenylacetone, 1,3-diphenylacetone, 4-acetylbiphenyl, 4,4'-diphenylbenzophenone, 1-benzoyl-4-piperidone, diphenyl carbonate, bibenzyl, diphenylmethylphosphate, 1-bromonapthalene, 2-phenoxybiphenyl, triphenylphosphate, cyclohexylphenylketone, 1,4-dibenzoylbutane, 2,4,6-trichlorophenol, mineral oil, paraffin oil, petroleum oil, for example, MOBILTHERM 600 ® heat transfer oil, MOBILTHERM 603 ® heat transfer oil, MOBILTHERM 605 ® heat transfer oil (®all trademarks of Mobil Oil Corporation), butyl stearate, 9-phenyl-anthracene, 2-phenylphenol, 1-ethoxynaphthalene, phenylbenzoate, 1-phenyldecane, 1-methoxynaphthalene, 2-methoxynaphthalene, 1,3-diphenoxybenzene, 1,8-dichloroanthraquinone, 9,10-dichloroanthracene, poly-phosphoric acid, 1-chloronaphthalene, diphenylether, 1-cyclohexyl-2-pyrrolidinone, hydrogenated terphenyl, for example, HB40 ® hydrogenated terphenyl (®trademark of the Monsanto Company), dioctylphthalate, 5-chloro-2-benzoxazolone, dibenzothiophene, diphenylsulfide, diphenylchlorophosphate, fluorene, sulfolane, methyl myristate, methyl stearate, hexadecane, dimethyl phthalate, tetraethylene glycol dimethylether, diethylene glycol dibutylether, docosane, eicosane, dotriacontane, 2,7-dimethoxynaphthalene, 2,6-dimethoxynaphthalene, o-terphenyl, 1,1-diphenylethylene, epsiloncaprolactam, thianthrene, silicone oil, for example, DC-704 ® silicone oil and DC-710 ® silicone oil (®trademarks of Dow-Corning Corporation), and mixtures thereof.

More preferred non-solvents include 1,3,5-triphenylbenzene, tetraphenylmethane, tetraphenylsilane, diphenylsulfoxide, 1,1-diphenylacetone, 1,3-diphenylacetone, diphenylcarbonate, diphenylmethylphosphate, 2-phenoxybiphenyl, butyl stearate, 9-phenylanthracene, 1-cyclohexyl-2-pyrrolidinone, mineral oil, paraffin oil, petroleum oil, for example, MOBILTHERM 600 ® heat transfer oil, MOBILTHERM 603 ® heat transfer oil, MOBILTHERM 605 ® heat transfer oil (®all trademarks of Mobil Oil Corporation), HB-40 ® hydrogenated terphenyl (®trademark of the Monsanto Company), dioctylphthalate, dibenzothiophene, diphenylchlorophosphate, methyl myristate, methyl stearate, docosane, eicosane, dotriacontane, o-terphenyl, thianthrene, silicone oil, for example, DC-704 ® silicone oil and DC-710 ® silicone oil (®trademarks of Dow-Corning Corporation), and mixtures thereof.

Even more preferred non-solvents include 1,3,5-triphenylbenzene, tetraphenylmethane, tetraphenylsilane, diphenylsulfoxide, 2-phenoxybiphenyl, butyl stearate, 9-phenylanthracene, dioctylphthalate, methyl stearate, docosane, dotriacontane, thianthrene, mineral oil, paraffin oil, petroleum oil, for example, MOBILTHERM 600 ® heat transfer oil, MOBILTHERM 603 ® heat transfer oil, MOBILTHERM 605 ® heat transfer oil (® all trademarks of Mobil Oil Corporation), and mixtures thereof.

The concentrations of the components in the mixture may vary and are dependent upon the desired membrane characteristics, such as porosity and pore size, and the fabrication method. The concentrations of poly(etheretherketone)-type polymer, the amorphous polymer, and the plasticizer in the mixture is that which result in a mixture with a suitable viscosity for extrusion or casting at the membrane fabrication temperature. The viscosity of the mixture must not be so high that the fluid is too viscous to fabricate; the viscosity must not be so low that the fluid lacks the physical integrity required to form a membrane. Extrusion mixtures of poly(etheretherketone)-type polymers, amorphous polymers, and plasticizers generally possess non-Newtonian viscosity behavior; therefore, such mixtures exhibit a shear rate dependence upon viscosity. The mixture preferably has a viscosity at extrusion temperatures of between about 100 and about 10,000 poise at a shear rate of from about 10 to about 10,000 sec$^{-1}$.

The concentration of poly(etheretherketone)-type polymer in the mixture is preferably from about 10 weight percent to about 90 weight percent, more preferably from about 20 weight percent to about 80 weight percent, even more preferably from about 25 weight percent to about 75 weight percent.

The concentration of amorphous polymer in the mixture is preferably from about 3 weight percent to about 80 weight percent, more preferably from about 3 weight percent to about 70 weight percent, even more preferably from about 3 weight percent to about 65 weight percent.

The membranes of this invention may be prepared by casting or extrusion. In the casting process, the polymers are contacted with the plasticizer comprising at least one solvent and optionally at least one non-solvent for the poly(etheretherketone)-type polymer at elevated temperatures. The elevated temperature at which the mixture is contacted is that temperature at which the mixture is a fluid, and below that temperature at which the polymers undergo substantial degradation and below that temperature at which the plasticizer comprising solvent and optional non-solvent boils. The upper temperature limit is preferably below about 360° C., more preferably below about 345° C., even more preferably below about 330° C. The minimum temperature limit is preferably at least about 25° C. The contacting preferably takes place with adequate mixing or agitation.

In the case of casting, a membrane may be cast into flat sheet form by pouring the mixture onto a smooth support surface and drawing down the mixture to an appropriate thickness with a suitable tool such as a doctor blade or casting bar. Alternately, the mixture may be cast in a continuous process by casting the mixture onto endless belts or rotating drums. The casting surface may be such that the membrane may thereafter be readily separated from the surface. For example, the membrane may be cast onto a support having a low surface energy, such as silicone, coated glass, Teflon, or coated metal, or a surface to which the membrane will not adhere. Alternately, the mixture may be cast onto a support surface which may thereafter be dissolved away from the finished membrane. The mixture may also be cast onto a porous support surface. The cast membrane is thereafter subsequently quenched or coagulated, leached, and optionally drawn as described hereinafter for membranes formed by the extrusion process.

Membranes may be extruded from the poly(etheretherketone)-type polymer mixtures hereinbefore described. The components of the extrusion mixture may be combined prior to extrusion by mixing in any convenient manner with conventional mixing equipment, as for example, in a Hobart brand mixer. The extrusion blend may also be combined and mixed under heating in a resin kettle. Alternately, the extrusion mixture may be combined by extruding the mixture through a twin screw extruder, cooling the extrudate, and grinding or pelletizing the extrudate to a particle size readily fed to a single or twin screw extruder. Alternately, the components of the extrusion composition may be combined directly in a melt-pot or twin screw extruder and extruded into membranes in a single step. The use of static mixers helps to ensure adequate mixing of the components.

The mixture is heated to a temperature which results in a fluid possessing a viscosity suitable for extrusion. The temperature should not be so high or the exposure time so long as to cause significant degradation of the poly(etheretherketone)-type polymer, the amorphous polymer, and/or the plasticizer. The temperature should not be so low as to render the fluid too viscous to extrude. The extrusion temperature is preferably between about 100° C. and about 400° C., more preferably between about 110° C. and about 380° C., even more preferably between about 120° C. and about 370° C.

The mixture of polymers and plasticizer is extruded through a film, tube, or hollow fiber die (spinnerette). Hollow fiber spinnerettes typically are multi-holed and thus produce a tow of multiple fibers. The hollow fiber spinnerettes include a means for supplying fluid to the core of the extrudate. The core fluid is used to prevent the collapsing of the hollow fibers as they exit the spinnerette. The core fluid may be a gas such as nitrogen, air, carbon dioxide, or other inert gas or a liquid which is a non-solvent for the polymers. Examples of suitable core liquids include dioctylphthalate, methyl stearate, polyglycol, mineral oil, paraffin oil, petroleum oil, for example, MOBILTHERM ® 600, 603, and 605 heat transfer oils (®trademarks of Mobil Oil Corporation), and silicone oil, for example, DC-704 ® and DC-710 ® silicone oil (®trademarks of Dow-Corning Corporation). Use of a liquid non-solvent as the core fluid may result in a microporous membrane with an inside skin. A solvent and non-solvent core liquid mixture may be used to control the inside skin morphology. A non-solvent fluid may optionally be used on the outside of the hollow fiber membrane to produce an outside skin.

The extrudate exiting the die enters one or more quench or coagulation zones. The environment of the quench or coagulation zone may be a gas or a liquid. Within the quench or coagulation zone, the extrudate is subjected to cooling and/or coagulation to cause solidification of the membrane with the optional simultaneous removal of a portion of the plasticizer.

In a preferred embodiment, the membrane is initially quenched in a gaseous environment such as air, nitrogen, or other inert gas. In a preferred embodiment, the membrane is slowly quenched or cooled, so as to permit sufficient time for phase separation to occur. With slow quenching or cooling, relatively low concentrations of amorphous polymer, that is, less than about 15 weight percent, may be used while still obtaining a membrane with a high flux. The temperature of the gaseous quench zone is that temperature at which solidification occurs at a reasonable rate. The temperature of the gaseous quench zone is preferably in the range of from about 0° C. to about 275° C., more preferably in the range of from about 5° C. to about 150° C., even more preferably in the range of from about 10° C. to about 90° C. The residence time in the gaseous quench zone is that which is sufficient to solidify the membrane. The residence time in the gaseous quench zone is preferably at least about 0.01 seconds, more preferably at least about 0.5 seconds, even more preferably at least about 2 seconds. The residence time in the gaseous quench zone is preferably less than about 300 seconds, more preferably less than about 120 seconds, even more preferably less than about 90 seconds. Shrouds may be used to help control gaseous flowrates and temperatures within gaseous quench zone.

Following or instead of the gaseous quench, the membrane may optionally be quenched or coagulated in a liquid environment which is substantially a non-solvent for the poly(etheretherketone)-type polymer, such as water, ethylene glycol, or glycerol, and which optionally contains an effective amount of a swelling agent. The temperature of the quench liquid is that temperature at which the membrane is not adversely affected and at which solidification occurs at a reasonable rate. The liquid quench temperature is preferably between about 0° C. and about 275° C., more preferably between about 5° C. and about 250° C., even more preferably between about 10° C. and about 225° C. The residence time in the liquid quench zone is that which is sufficient to solidify the membrane. The residence time in the liquid quench zone is preferably at least about 0.01 seconds, more preferably at least about 0.05 seconds. The residence time in the liquid quench zone is preferably less than about 300 seconds, more preferably less than about 120 seconds, even more preferably less than about 90 seconds.

Following quenching and/or coagulation, the membrane may be passed through one or more leach zones to remove at least a portion of the plasticizer, at least a portion of the amorphous polymer, or a combination thereof. The leach zone need not remove all of the plasticizer and/or amorphous polymer from the membrane. The leach zone preferably removes a substantial portion of the plasticizer and amorphous polymer from the membrane. Preferably, the leach zone removes the plasticizer to a level of less than about 5.0 weight percent in the leached membrane, more preferably of less than about 2.0 weight percent in the leached membrane, even more preferably of less than about 0.5 weight percent in the leached membrane. Preferably, the leach zone removes the amorphous polymer to a level of less than about 5.0 weight percent in the leached membrane, more preferably of less than about 2.0 weight percent in the leached membrane, even more preferably of less than about 0.5 weight percent in the leached membrane.

The leach zone is comprised of a liquid which is a non-solvent for the poly(etheretherketone)-type polymer and which is a solvent for the plasticizer and/or amorphous polymer. Preferred leach liquids include toluene, xylene, acetone, water, and chlorinated hydrocarbons such as methylene chloride, carbon tetrachloride, trichloroethylene, and 1,1,1-trichloroethane. The leach liquid may also comprise an acid or alkali aqueous solution if an acid or alkali soluble solvent and optional non-solvent for the poly(etheretherketone)-type polymer are used in the extrusion or casting mixture.

The maximum temperature of the leach bath is that temperature at which the membrane is not adversely affected. The minimum temperature of the leach bath is that temperature at which plasticizer and/or amorphous polymer removal from the membrane occurs at a reasonable rate. The temperature of the leach bath is preferably between about 0° C. and about 250° C., more preferably between about 5° C. and about 200° C., even more preferably between about 10° C. and about 150° C. The residence time in the leach bath is preferably long enough to remove at least a portion of the plasticizer and/or amorphous polymer. The residence time in the leach bath is preferably less than about 14 hours, more preferably less than about 2 hours. The residence time in the leach bath is preferably more than about 1 second, more preferably more than about 30 seconds.

Following leaching, the membrane may optionally be dried. Prior to drying, the leach liquid remaining in the membrane may optionally be exchanged with a more volatile, non-polar drying agent which possesses a low surface tension and is a solvent for the leach liquid and which is a non-solvent for the poly(etheretherketone)-type polymer in order to reduce the possibility of pore collapse during drying. Preferred drying agents include chlorofluorocarbons, for example, FREON 113 ® chlorofluorocarbon (®trademark of E.I. duPont de Nemours). The exchange may be carried out at temperatures which do not adversely affect the membrane, preferably between about 0° C. and about 100° C. The membrane may be dried in air or an inert gas such as nitrogen. Drying may also be done under vacuum. The membrane may be dried at temperatures at which drying takes place at a reasonable rate and which do not adversely affect the membrane. The drying temperature is preferably between about 0° C. and about 180° C., more preferably between about 10° C. and 150° C., even more preferably between about 15° C. and about 120° C. The drying time is preferably less than about 24 hours, more preferably less than about 6 hours. The drying time is preferably at least about 30 seconds, more preferably at least about 60 seconds.

The membrane may optionally be drawn or stretched subsequent to the quenching or coagulation step using conventional equipment such as godets to improve the flux and strength of the membrane. Drawing may occur before leaching, during leaching, after leaching, before drying, after drying, or a combination thereof. The draw temperature is dependent upon whether the membrane contains plasticizer at the time of drawing. For substantially plasticizer-free membranes, the membrane is drawn at a temperature which is above the glass transition temperature and below the crystalline melting point of the poly(etheretherketone)-type polymer; the minimum temperature at which the membrane is drawn is preferably at least about 140° C., more preferably at least about 150° C. The maximum temperature at which the membrane is drawn is preferably less than about 360° C., more preferably less than about 330° C. For membranes containing plasticizer, the membrane is drawn at a temperature between ambient temperature and the melting point of the poly(etheretherketone)-type polymer or the depressed melting point of the poly(etheretherketone)-type polymer and plasticizer mixture; preferred lower draw temperatures are above about 25° C.; preferred upper draw temperatures are less than about 10° C. below the depressed melting point. The membranes are drawn by stretching the membranes under tension. The membranes are drawn to a ratio of between about 1.1 and about 40, more preferably of between about 1.5 and about 30. The draw ratio refers to the ratio of the original length of the membrane before drawing to the final length of the membrane after drawing. The degree of draw may also be expressed as percent elongation, which is calculated by $$\left(\frac{L_f - L_i}{L_i}\right) \times 100,$$

wherein $L_f$ is the final length of the membrane after drawing and $L_i$ is the initial length of the membrane before drawing. Drawing may be carried out in a single step or in a series of steps using the same or different draw ratios in each step.

Line speeds for drawing are not critical and may vary significantly. Practical preferred line speeds range from about 10 feet per minute (3 meters per minute) to about 2,000 feet per minute (610 meters per minute). In the case of hollow fibers, the fibers preferably possess an outside diameter of from about 10 to about 7,000 microns, more preferably of from about 50 to about 5,000 microns, even more preferably of from about 100 to about 3,000 microns with a wall thickness preferably of from about 10 to about 700 microns, more preferably of from about 25 to about 500 microns. In the case of films, the films preferably possess a thickness of from about 10 to about 700 microns, more preferably of from about 25 to about 500 microns. The films may optionally be supported by a permeable cloth or screen.

Optionally, before leaching, after leaching, before drawing, after drawing, or a combination thereof, the membrane may be annealed by exposing the membrane to elevated temperatures. The membrane may be annealed at temperatures above the glass transition temperature (Tg) of the polymer or polymer and plasticizer mixture and about 10° C. below the melting point of the polymer or depressed melting point of the polymer and plasticizer mixture for a period of time between about 30 seconds and about 24 hours.

The membranes of this invention may be isotropic or anisotropic. Isotropic microporous membranes possess a morphology in which the pore size within the membrane is substantially uniform throughout the membrane. Anisotropic (asymmetric) microporous membranes possess a morphology in which a pore size gradient exists across the membrane; that is, the membrane morphology varies from highly porous, larger pores at one membrane surface to less porous, smaller pores at the other membrane surface. Such anisotropic membranes thus possess a microporous "skin" of smaller pores. In hollow fiber anisotropic membranes, the "skin" may be on the inside or outside surface of the hollow fiber. The term asymmetric is often used interchangeably with the term anisotropic.

In a preferred embodiment of this invention, the microporous membranes are useful in the treatment of liquids by the membrane separation processes of microfiltration, ultrafiltration, macrofiltration, depth filtration, membrane stripping, and membrane distillation. Such membranes may also be used as porous supports for composite gas or liquid separation membranes. In a preferred embodiment, the microporous membranes are useful for ultrafiltration or microfiltration. Ultrafiltration and microfiltration are pressure driven filtration processes using microporous membranes in which particles or solutes are separated from solutions. Separation is achieved on the basis of differences in particle size or molecular weight. Macrofiltration is a pressure drive filtration process using microporous membranes to separate particles or solutes having a size greater than about 10 microns from solution.

Ultrafiltration and microfiltration membranes may be characterized in a variety of ways, including porosity, mean pore size, maximum pore size, bubble point, gas flux, water flux, Scanning Electron Microscopy (SEM), and molecular weight cut off. Such techniques are well known in the art for characterizing microporous membranes. See Robert Kesting, *Synthetic Polymer Membranes*, 2nd edition, John Wiley & Sons, New York, N.Y., 1985, pp. 43-64; Channing R. Robertson (Stanford University), *Molecular and Macromolecular Sieving by Asymmetric Ultrafiltration Membranes*, OWRT Report, NTIS No. PB85-1577661EAR, September 1984; and ASTM Test Methods F316-86 and F317-72 (1982); the relevant portions are incorporated herein by reference.

Porosity refers to the volumetric void volume of the membrane. The membranes must possess porosities permitting sufficient flux through the membrane while retaining sufficient mechanical strength under use conditions. The membranes of this invention preferably have a porosity of at least about 10 percent, more preferably of at least about 20 percent, even more preferably of at least about 25; the membranes of this invention preferably have a porosity of less than about 90 percent, more preferably of less than about 80 percent, even more preferably of less than about 75 percent.

Pore size of the membrane may be estimated by several techniques including Scanning Electron Microscopy (SEM), and/or measurements of bubble point, gas flux, water flux, and molecular weight cut off. The pore size of any given membrane is distributed over a range of pore sizes, which may be narrow or broad.

The bubble point pressure of a membrane is measured by mounting the membrane in a pressure cell with liquid in the pores of the membrane. The pressure of the cell is gradually increased until air bubbles permeate the membrane. Because larger pores become permeable at lower pressures, the first appearance of bubbles is indicative of the maximum pore size of the maximum pore size of the membrane. If the number of pores which are permeable to air increases substantially with a small increase in pressure, a narrow pore size distribution is indicated. If the number of air-permeable pores increases gradually with increasing pressure, a broad pore size distribution is indicated. The relationship between pore size and bubble point pressure can be calculated from the equation $$r = \frac{2G}{P}$$

wherein
r is the pore radius,
G is the surface tension of the liquid in the membrane pores, and
P is the pressure.

The mean pore size of the membranes of this invention useful for ultrafiltration is preferably between about 5 Angstroms and about 1,000 Angstroms, more preferably between about 10 Angstroms and about 500 Angstroms; the maximum pore size of such membranes is preferably less than about 1,000 Angstroms, more preferably less than about 800 Angstroms. The mean pore size of the membranes of this invention useful for microfiltration is preferably between about 0.02 micron and about 10 microns, more preferably between about 0.05 micron and about 5 microns; the maximum pore size of such membranes is preferably less than about 10 microns, more preferably less than about 8 microns. The mean pore size of membranes of this invention useful for macrofiltration is preferably between about 10 microns and about 50 microns.

Gas flux is defined as $$F = \frac{\text{(amount of gas passing through the membrane)}}{\text{(membrane area) (time) (driving force across the membrane)}}$$

A standard gas flux unit is $$\frac{\text{(centimeter)}^3 \text{ (STP)}}{\text{(centimeter)}^2 \text{ (second) (centimeter Hg)}},$$

abbreviated hereinafter as $$\frac{\text{cm}^3 \text{ (STP)}}{\text{cm}^2 \text{ sec cmHg}},$$

where STP stands for standard temperature and pressure.

The membranes of this invention preferably have a gas flux for nitrogen of at least about $$10^{-6} \frac{\text{cm}^3 \text{ (STP)}}{\text{cm}^2 \text{ sec cmHg}},$$

more preferably of at least about $$10^{-5} \frac{cm^3 \text{ (STP)}}{cm^2 \text{ sec cmHg}},$$

even more preferably of at least about $$10^{-4} \frac{cm^3 \text{ (STP)}}{cm^2 \text{ sec cmHg}}.$$

Water flux is defined as $$W = \frac{\text{(amount of water passing through the membrane)}}{\text{(membrane area) (time)}},$$

under given conditions of temperature and pressure.

The membranes of this invention preferably exhibit a water flux of at least about $$1 \frac{ml}{m^2 \text{ hr cmHg}},$$

more preferably of at least about $$10 \frac{ml}{m^2 \text{ hr cmHg}},$$

even more preferably of at least about $$100 \frac{ml}{m^2 \text{ hr cmHg}}.$$

The membranes are fabricated into flat sheet, spiral wound, tubular, or hollow fiber devices by methods described in the art. Spiral wound, tubular, and hollow fiber devices are preferred. Tubesheets may be affixed to the membranes by techniques known in the art. Preferred tubesheet materials include thermoset and thermoplastic polymers. The membrane is sealingly mounted in a pressure vessel in such a manner that the membrane separates the vessel into two fluid regions wherein fluid flow between the two regions is accomplished by fluid permeating through the membrane. Conventional membrane devices and fabrication procedures are well known in the art.

Ultrafiltration, microfiltration, and macrofiltration are pressure driven filtration processes using microporous membranes to recover or isolate solutes or particles from solutions. The membrane divides the separation chamber into two regions, a higher pressure side into which the feed solution is introduced and a lower pressure side. One side of the membrane is contacted with the feed solution under pressure, while a pressure differential is maintained across the membrane. To be useful, at least one of the particles or solutes of the solution is selectively retained on the high pressure side of the membrane while the remainder of the solution selectively passes through the membrane. Thus the membrane selectively "rejects" at least one type of the particles or solutes in the solution, resulting in a retentate stream being withdrawn from the high pressure side of the membrane which is enriched or concentrated in the selectively rejected particle(s) or solute(s) and a filtrate stream being withdrawn from the low pressure side of the membrane which is depleted in the selectively rejected particle(s) or solute(s).

The separation process should be carried out at pressures which do not adversely affect the membrane, that is, pressures which do not cause the membrane to mechanically fail. The pressure differential across the membrane is dependent upon the membrane characteristics, including pore size and porosity. For the membranes of this invention useful for ultrafiltration or microfiltration, the pressure differential across the membrane is preferably between about 5 psig and about 500 psig, more preferably between about 10 psig and about 300 psig, even more preferably between about 25 psig and about 150 psig. For the membranes of this invention useful as composite supports for gas or liquid separation membranes, the pressure differential across the membrane is preferably between about 5 psig and about 1,500 psig. The separation process should be carried out at temperatures which do not adversely affect membrane integrity. Under continuous operation, the operating temperature is preferably between about 0° C. and about 300° C., more preferably between about 15° C. and about 250° C., even more preferably between about 20° C. and about 175° C.

SPECIFIC EMBODIMENTS

The following examples are presented for illustrative purposes only and are not intended to limit the scope of the invention or claims.

EXAMPLE 1

Solvents and Non-solvents for Poly(etheretherketone) (PEEK).

Poly(etheretherketone) (PEEK), designated as Grade 150P, was obtained from ICI Americas, Inc., Wilmington, Delaware. The PEEK was dried at about 150° C. for 16 hours in an air-circulating oven and was stored in a desiccator over Drierite. One hundred seven organic compounds were evaluated for their solvent effect on PEEK. Most of the organic compounds were obtained from Aldrich Chemical Company and used as received. Other organic chemicals were obtained from suppliers as listed in *Chemical Sources*, published annually by Directories Publishing Co., Inc., of Columbia, South Carolina.

Mixtures of PEEK and a solvent or a non-solvent, a total weight of less than about 2 grams, were prepared by weighing PEEK and solvent to a precision of ±0.001 gram in a 1 to 4 dram size glass vial. The resulting air space in each vial, which varied considerably due to the large differences in the bulk densities of the compounds, was purged with nitrogen. The vials were sealed with screw caps containing aluminum foil liners. Solubility was usually determined at about 10 weight percent polymer, followed by additional determinations at about 25 and about 50 weight percent if necessary.

In the following tables, in the solubility column, "g" is greater than (>), and "s" is smaller or less than (<), and "=" is equal to.

Table I lists the solvent effect of 107 organic compounds on PEEK. The approximate solubility of each polymer-organic compound mixture is shown at the indicated temperature(s). Also listed in Table 1 is an approximate molecular weight, melting point, and boiling point of each organic compound, if these physical properties were available.

FIG. 1 shows a composite of temperature at ambient pressure at which a specific weight percent of PEEK will dissolve in the solvents m-terphenyl, pyrene, fluoranthene and diphenylsulfone. Any combination of temperature and polymer concentration above each line represents soluble, one phase mixtures. Similarly, any combination below each line represents insoluble, multi-phase mixtures.

TABLE I

| Compound | Molec. Weight | Melting Point | Boiling Point | Approximate Solub. (g = >; s = <) | Temp. (°C.) |
|---|---|---|---|---|---|
| Triphenylmethanol | 260 | 161 | 360 | g 50.1%? | 349 |
| Triphenylmethane | 244 | 93 | 359 | g 50.2% | 349 |
| Triphenylene | 228 | 196 | 438 | g 50.0% | 350 |
| 1,2,3-Triphenylbenzene | 306 | 158 | — | g 50.1% | 349 |
| 1,3,5-Triphenylbenzene | 306 | 173 | 460 | s 9.9% | 349 |
| Tetraphenylmethane | 320 | 281 | 431 | =s 10.7% | 349 |
| Tetraphenylsilane | 337 | 236 | 422 | s 10.1% | 349 |
| Diphenyl sulfoxide | 202 | 70 | 350 | s 10.5%a | 349 |
| Diphenyl sulfone | 218 | 124 | 379 | g 50.0% | 349 |
| 2,5-Diphenyloxazole | 221 | 72 | 360 | g 50.0% | 349 |
| Diphenic acid | 242 | 228 | — | g 25.1%?a | 349 |
| 1,1-Diphenylacetone | 210 | 60 | — | s 10.0% | 302 |
| 1,3-Diphenylacetone | 210 | 33 | 330 | s 10.1% | 302 |
| 4-Acetylbiphenyl | 196 | 117 | — | s 10.3% | 302 |
| 2-Biphenylcarboxylic acid | 198 | 109 | 349 | g 50.1% | 349 |
| 4-Biphenylcarboxylic acid | 198 | 225 | — | g 10.0% | 349 |
| 4-Biphenylcarboxylic acid | 198 | 225 | — | =g 50.1%? | 349 |
| m-Terphenyl | 230 | 83 | 379 | g 50.2% | 349 |
| m-Terphenyl | 230 | 83 | 379 | s 5.0% | 302 |
| 4-Benzoylbiphenyl | 258 | 100 | 419 | g 50.1% | 349 |
| 4-Benzoylbiphenyl | 258 | 100 | 419 | s 5.2% | 302 |
| 4,4'-Diphenylbenzophenone | 334 | — | — | s 10.4% | 302 |
| 1-Benzoyl-4-piperidone | 203 | 56 | 399 | g 9.8%?a | 349 |
| 2-Benzoylnaphthalene | 232 | 81 | 383 | g 49.9% | 349 |
| Diphenyl carbonate | 214 | 79 | 301 | s 10.1% | 302 |
| Bibenzyl | 182 | 51 | 284 | s 10.3% | 274 |
| Diphenyl methyl phosphate | 264 | — | 389 | s 10.0%a | 349 |
| 1-Bromonaphthalene | 207 | −1 | 280 | s 9.8% | 274 |
| N,N-Diphenylformamide | 197 | 71 | 337 | g 9.9% | 302 |
| N,N-Diphenylformamide | 197 | 71 | 337 | s 25.2% | 302 |
| 3-Phenoxybenzyl alcohol | 200 | — | 329 | g 24.7% | 302 |
| 3-Phenoxybenzyl alcohol | 200 | — | 329 | s 49.9% | 302 |
| Fluoranthene | 202 | 108 | 384 | g 50.0% | 349 |
| 2-Phenoxybiphenyl | 246 | 49 | 342 | s 10.9% | 302 |
| Triphenyl phosphate | 326 | 51 | 281 | s 9.9% | 274 |
| Cyclohexyl phenyl ketone | 188 | 56 | — | s 9.9% | 302 |
| 2,5-Diphenyl-1,3,4-oxadiazole | 222 | 139 | 382 | g 49.9% | 349 |
| 1,4-Dibenzoylbutane | 266 | 107 | — | s 10.0% | 302 |
| 9-Fluorenone | 180 | 83 | 342 | g 24.9% | 302 |
| 9-Fluorenone | 180 | 83 | 342 | s 50.0% | 302 |
| 1,2-Dibenzoyl benzene | 286 | 146 | — | g 50.2% | 349 |
| Dibenzoylmethane | 224 | 78 | 360 | g 50.4% | 349 |
| 2,4,6-Trichlorophenol | 197 | 65 | 246 | s 9.0% | 240 |
| Benzil | 210 | 94 | 347 | g 10.2% | 302 |
| Benzil | 210 | 94 | 347 | s 25.0% | 302 |
| p-Terphenyl | 230 | 212 | 389 | s 9.8% | 302 |
| p-Terphenyl | 230 | 212 | 389 | g 50.0% | 349 |
| Anthracene | 178 | 216 | 340 | g 10.0% | 302 |
| Anthracene | 178 | 216 | 340 | s 24.7% | 302 |
| Mineral oil | — | — | 360 | s 10.7% | 349 |
| Butyl stearate | 341 | — | 343 | s 10.0% | 302 |
| 9-Phenylanthracene | 254 | 151 | 417 | g 10.4%?a | 349 |
| 1-Phenylnaphthalene | 204 | — | 324 | g 9.9% | 302 |
| 1-Phenylnapthalene | 204 | — | 324 | s 25.0% | 302 |
| 4-Phenylphenol | 170 | 166 | 321 | g 25.8% | 297 |
| 4-Phenylphenol | 170 | 166 | 321 | s 50.0% | 302 |
| 4-Phenylphenol | 170 | 166 | 321 | g 50.0% | 304 |
| 2-Phenylphenol | 170 | 59 | 282 | s 10.2% | 274 |
| 1-Ethoxynaphthalene | 172 | — | 280 | s 10.2% | 274 |
| Phenyl benzoate | 198 | 69 | 298 | s 9.8% | 274 |
| 1-Phenyldecane | 218 | — | 293 | s 10.2% | 274 |
| 1-Methoxynaphthalene | 158 | — | 269 | s 10.0% | 240 |
| 2-Methoxynaphthalene | 158 | 74 | 274 | s 9.4% | 240 |
| 4-Bromobiphenyl | 233 | 86 | 310 | g 5.2% | 300 |
| 4-Bromobiphenyl | 233 | 86 | 310 | s 24.8% | 302 |
| 4-Bromobiphenyl | 233 | 86 | 310 | s 5.2% | 241 |
| 4-Bromodiphenyl ether | 249 | 18 | 305 | =g 5.4% | 300 |
| 4-Bromodiphenyl ether | 249 | 18 | 305 | s 24.8% | 302 |
| 4-Bromodiphenyl ether | 249 | 18 | 305 | s 5.4% | 241 |
| 1,3-Diphenoxybenzene | 262 | 60 | — | =s 5.4%a | 300 |
| 1,3-Diphenoxybenzene | 262 | 60 | — | s 5.4%a | 241 |
| 1,8-Dichloroanthraquinone | 277 | 202 | — | s 5.3%a | 300 |
| 1,8-Dichloroanthraquinone | 277 | 202 | — | s 5.3%a | 241 |
| 9,10-Dichloroanthracene | 247 | 214 | — | s 5.5a% | 300 |

TABLE I-continued

| | | | Approximate | | |
|---|---|---|---|---|---|
| Compound | Molec. Weight | Melting Point | Boiling Point | Solub. (g = >; s = <) | Temp. (°C.) |
| 4,4'-Dibromobiphenyl | 312 | 170 | 355 | s 5.2% | 241 |
| 4,4'-Dibromobiphenyl | 312 | 170 | 355 | g 5.2% | 300 |
| 4,4'-Dibromobiphenyl | 312 | 170 | 355 | g 5.2% | 300 |
| 4,4'-Dibromobiphenyl | 312 | 170 | 355 | s 25.1% | 302 |
| 4,4'-Dibromobiphenyl | 312 | 170 | 355 | g 50.1% | 349 |
| Benzophenone | 182 | 50 | 305 | s 11.3% | 241 |
| Benzophenone | 182 | 50 | 305 | =g 11.3% | 300 |
| Benzophenone | 182 | 50 | 305 | s 24.9% | 302 |
| Polyphosphoric acid | — | — | — | s 4.8%a | 300 |
| 1-Chloronaphthalene | 162 | −20 | 258 | s 9.9% | 241 |
| Diphenyl ether | 170 | 27 | 259 | s 10.1% | 241 |
| 1-Cyclohexyl-2-pyrrolidinone | 167 | — | 302 | =s 10.0%a | 300 |
| 1-Benzyl-2-pyrrolidinone | 175 | — | — | g 14.9% | 302 |
| 1-Benzyl-2-pyrrolidinone | 175 | — | — | s 32.9% | 302 |
| o,o'-Biphenol | 186 | 109 | 315 | s 5.1% | 221 |
| o,o'-Biphenol | 186 | 109 | 315 | g 9.8% | 302 |
| o,o'-Biphenol | 186 | 109 | 315 | s 25.0% | 302 |
| HB-40 (hydrogenated terphenyl)* | 244 | — | 325 | s 9.9% | 302 |
| Dioctyl phthalate | 391 | −50 | 384 | s 10.8% | 349 |
| 5-Chloro-2-benzoxazolone | 170 | 191 | — | s 10.2%a | 349 |
| Dibenzothiophene | 184 | 98 | 332 | g 10.3%?b? | 302 |
| Bis(4-chlorophenyl sulfone) | 287 | 146 | 412 | s 15.3% | 349 |
| Diphenyl phthalate | 318 | 79.5 | — | g 50.0% | 349 |
| 2,6-Diphenylphenol | 246 | 101 | — | g 50.0% | 349 |
| Diphenyl sulfide | 186 | −40 | 296 | s 9.0% | 274 |
| Diphenyl chlorophosphate | 269 | — | 360 | s 9.9% | 349 |
| Fluorene | 166 | 113 | 298 | s 10.1% | 274 |
| Phenanthrene | 178 | 100 | 340 | g 10.0% | 302 |
| Phenanthrene | 178 | 100 | 340 | s 25.0% | 302 |
| Sulfolane | 120 | 27 | 285 | s 10.1% | 274 |
| Methyl myristate | 242 | 18 | 323 | s 8.2% | 302 |
| Methyl stearate | 299 | 38 | 358 | s 10.1% | 349 |
| Phenothiazine | 199 | 182 | 371 | g 49.9% | 349 |
| Hexadecane | 226 | 19 | 288 | s 10.0% | 274 |
| Dimethyl phthalate | 194 | 2 | 282 | s 10.0% | 274 |
| Tetraethylene glycol dimethyl ether | 222 | −30 | 275 | s 9.6% | 240 |
| Diethylene glycol dibutyl ether | 218 | −60 | 256 | s 9.6% | 240 |
| Docosane | 311 | 44 | 369 | s 10.4% | 349 |
| Eicosane | 283 | 37 | 340 | s 7.9% | 302 |
| Dotriacontane | 451 | 70 | 476 | s 10.4% | 349 |
| 2,7-Dimethoxynaphthalene | 188 | 138 | — | g 10.0%ab | 349 |
| 2,6-Dimethoxynaphthalene | 188 | 153 | — | g 10.8%b | 349 |
| o-Terphenyl | 230 | 58 | 337 | s 9.9% | 302 |
| 4,4'-Dimethoxy-benzophenone | 242 | 142 | — | g 50.0% | 349 |
| 9,10-Diphenylanthracene | 330 | 246 | — | g 50.0% | 349 |
| 1,1-Diphenylethylene | 180 | 6 | 270 | s 9.7% | 240 |
| epsilon-Caprolactam | 113 | 71 | 271 | s 10.0% | 240 |
| Tetraphenylethylene | 332 | 223 | 420 | s 10.9% | 302 |
| Pentafluorophenol | 184 | 35 | 143 | s 9.9% | 140 |
| Pentafluorophenol | 184 | 35 | 143 | g 5.0% | 141 |
| Thianthrene | 216 | 158 | 365 | s 10.2% | 302 |
| Pentachlorophenol | 266 | 189 | 310 | g 25.0% | 302 |
| Pentachlorophenol | 266 | 189 | 310 | s 50.6% | 302 |
| Pyrene | 202 | 150 | 404 | g 50.0% | 347 |
| Benzanthrone | 230 | 169 | — | s 25.5%ab | 328 |
| 9,9'-Bifluorene | 330 | 247 | — | g 25.2% | 327 |
| 9,9'-Bifluorene | 330 | 247 | — | s 50.2% | 318 |
| 9,9'-Bifluorene | 330 | 247 | — | g 50.2% | 327 |
| Santowax R* Chem Abstr. #26140-60-3 | — | 145 | 364 | g 60.0% | 347 |
| Therminol 66* Chem. Abstr. #61788-32-7 | 240 | — | 340 | g 50.1% | 337 |
| Therminol 75* Chem Abstr. #26140-60-3 Chem Abstr. #217-59-4 | — | 70 | 385 | g 24.9% | 325 |
| Therminol 75* | — | 70 | 385 | g 50.3% | 332 |
| 1-Phenyl-2-pyrrolidinone | 161 | 68 | 345 | g 10.1% | 279 |
| 1-Phenyl-2-pyrrolidinone | 161 | 68 | 345 | g 25.5% | 290 |
| 1-Phenyl-2-pyrrolidinone | 161 | 68 | 345 | g 50.0% | 317 |
| 4,4'-Isopropylidenediphenol | 228 | 156 | 402 | =g 50.0% | 301 |
| 4,4'-Isopropylidenediphenol | 228 | 156 | 402 | g 50.0% | 318 |
| 4,4'-Didihydroxy-benzophenone | 214 | 214 | — | s 10.0% | 301 |
| 4,4'-Dihydroxy-benzo- | 214 | 214 | — | g 25.0% | 310 |

TABLE I-continued

| Compound | Molec. Weight | Melting Point | Boiling Point | Approximate Solub. (g = >; s = <) | Temp. (°C.) |
|---|---|---|---|---|---|
| phenone 4,4'-Dihydroxy-benzo-phenone | 214 | 214 | — | s 50.0% | 319 | a = Black or very dark color
b = reacts?
*Monsanto Company

EXAMPLE 2

Microporous hollow fiber membranes comprising unsulfonated poly(etheretherketone) (PEEK) were prepared from several different extrusion blends containing VICTREX® 450G poly(etheretherketone) (®trademark of ICI Americas, Inc.), UDEL P1700 polysulfone, available from Amoco Chemicals Corp., and diphenylsulfone using the following general procedure.

Each extrusion blend was prepared in a resin kettle equipped with an air-motor driven agitator, a heating mantle with temperature controller, a thermocouple, and a nitrogen purge. A weighed amount of the solvent, diphenylsulfone (DPS), was loaded into the resin kettle. After melting the solvent, agitation was commenced and the temperature increased. As the temperature approached about 200° C., stepwise addition of the amorphous polymer, polysulfone (PS), to the solvent was initiated. As the temperature of the mixture approached about 300° C., stepwise addition of the PEEK polymer was initiated. After addition of all of the polymer, mixing continued at about 350° C. for about 1 hour. The hot blend was poured into stainless steel trays. The cooled and solidified blend was chopped into small pieces and then ground.

A ¾ inch (1.9 centimeter) Killion single screw extruder equipped with a hollow fiber spinnerette and nitrogen core gas was used to extrude hollow fibers from the ground blends at a temperature of about 300° C. The hollow fiber extrudate was water-quenched. Water-quenched hollow fibers were produced by pulling the hollow fiber extrudate through a water bath at room temperature with a variable-speed godet and taking up the quenched hollow fibers on cores mounted on a conventional Leesona machine.

The extruded hollow fibers were leached in methylene chloride or N-methyl-2-pyrrolidinone to remove the solvent and amorphous polymer. Following leaching, solvent exchange with Freon 113 fluorocarbon, (1,1,2-trichloro-trifluoroethane), available from duPont de Nemours, was performed to minimize shrinkage of the hollow fibers. The hollow fibers containing Freon 113 fluorocarbon were air dried at room temperature.

The hollow fiber membranes were assembled into test cells having epoxy tubesheets cured at about 60° C. The hollow fiber membranes were evaluated for nitrogen flux, burst strength, water flux, and/or maximum pore size by the bubble point method. Data are given in Tables IIA and IIB.

TABLE IIA

| Blend | Blend Composition[1] (weight percent) | Leach Fluid | Leach Time (hours) | Tension During Leach | Weight Loss After Leaching (percent) | Average Fiber Size (microns) ID | Wall |
|---|---|---|---|---|---|---|---|
| 2A | 30% PEEK 20% PS 50% DPS | Methylene Chloride | 3.0 | No | 66 | 300 | 75 |
| 2B | 30% PEEK 20% PS 50% DPS | Methylene Chloride | 2-24 | Yes | 65-66 | 370 | 90 |
| 2C | 30% PEEK 20% PS 50% DPS | N-methyl-2-pyrrolidinone | 2 | Yes | 65 | 360 | 70 |
| 2D | 25% PEEK 30% PS 45% DPS | Methylene Chloride | 2.5 | Yes | 69-71 | 300 | 110 |

[1]PEEK = VICTREX ® 450G poly(etheretherketone), available from ICI Americas, Inc.
PS = UDEL P1700 polysulfone, available from Amoco Chemicals Corp.
DPS = diphenylsulfone.
m-T = m-Terphenyl.

TABLE IIB

| Blend | Blend Composition[1] (weight percent) | Nitrogen Flux $\frac{cm^3 (STP)}{cm^2 \ sec \ cmHg}$ | Water Flux $\frac{ml}{m^2 \ hr \ cmHg}$ | Maximum Pore Size (microns) | Burst Strength (psi) |
|---|---|---|---|---|---|
| 2A | 30% PEEK 20% PS 50% DPS | $3.3 \times 10^{-2}$ | — | — | 20 |
| 2B | 30% PEEK 20% PS 50% DPS | $2.6 \times 10^{-2}$ to $4.2 \times 10^{-2}$ | 1500-2200 | 0.2-0.5 | — |
| 2C | 30% PEEK | $1.3 \times 10^{-2}$ | — | — | — |

TABLE IIB-continued

| Blend | Blend Composition[1] (weight percent) | $\left(\dfrac{\text{Nitrogen Flux}}{\text{cm}^2 \text{ sec cmHg}} \text{cm}^3 \text{(STP)}\right)$ | $\left(\dfrac{\text{Water Flux}}{\text{m}^2 \text{ hr cmHg}} \text{ml}\right)$ | Maximum Pore Size (microns) | Burst Strength (psi) |
|---|---|---|---|---|---|
| 2D | 20% PS 50% DPS 25% PEEK 30% PS 45% DPS | $1.1 \times 10^{-2}$ to $1.3 \times 10^{-2}$ | — | — | 15 |

[1]PEEK = VICTREX ® 450G poly(etheretherketone), available from ICI Americas, Inc.
PS = UDEL P1700 polysulfone, available from Amoco Chemicals Corp.
DPS = diphenylsulfone.
m-T = m-Terphenyl.

EXAMPLE 3

Microporous hollow fiber membranes comprising unsulfonated poly(etheretherketone) (PEEK) were prepared from several different extrusion blends containing different amorphous polymers and/or solvents using the following general procedure.

Each extrusion blend was prepared in a resin kettle equipped with an air-motor driven agitator, a heating mantle with temperature controller, a thermocouple, and a nitrogen purge. A weighed amount of the solvent, either diphenylsulfone (DPS) or m-terphenyl (m-T), was loaded into the resin kettle. After melting the solvent, agitation was commenced and the temperature increased. As the temperature approached about 200° C., stepwise addition of the amorphous polymer, ether UDEL P1700 polysulfone (PS), available from Amoco Chemicals Corp., or VICTREX® polyethersulfone (PES), available from ICI Americas, Inc., to the solvent was initiated. As the temperature of the mixture approached about 300° C., stepwise addition of the PEEK polymer, VICTREX® 450G, available from ICI Americas, Inc., was initiated. After addition of all of the polymer, mixing continued at about 320° C. to about 360° C. for about 1 hour. The hot blend was poured into stainless steel trays. The cooled and solidified blend was chopped into small pieces and then ground.

A ¾ inch (1.9 centimeter) Killion single screw extruder equipped with a hollow fiber spinnerette and nitrogen core gas was used to extrude hollow fibers from the ground blends. The hollow fiber extrudate was air-quenched by the free-falling method, that is, by allowing the hollow fiber extrudate to free fall to the floor under the influence of gravity only.

The extruded hollow fibers were leached in methylene chloride at room temperature for about 1 hour to remove the solvent and amorphous polymer. Following leaching, solvent exchange with Freon 113 fluorocarbon (1,1,2-trichloro-trifluoroethane), available from duPont de Nemours, was performed to minimize shrinkage of the hollow fibers. The hollow fibers containing Freon 113 fluorocarbon were air dried at room temperature.

The hollow fiber membranes were assembled into test cells having epoxy tubesheets cured at about 60° C. The hollow fiber membranes were evaluated for nitrogen flux, burst strength, water flux, and/or maximum pore size by the bubble point method using ethanol. Data are given in Tables IIIA and IIIB.

TABLE IIIA

| Blend | Blend Composition[1] (weight percent) | Extrusion Temperature (°C.) | Fiber Size (microns) ID | Fiber Size (microns) Wall | Weight Loss After Leaching (percent) |
|---|---|---|---|---|---|
| 3A | 33% PEEK 7% PS 60% DPS | 292 | 400 | 40 | 58.8–59.9 |
| 3B | 30% PEEK 10% PS 60% DPS | 281–285 | 200 to 300 | 50 | 62.5–64.8 |
| 3C | 30% PEEK 15% PS 55% DPS | 301 | 350 to 400 | 50 | 62.7–63.5 |
| 3D | 30% PEEK 10% PS 60% m-T | 297 | 175 to 225 | 60 | 62.7–64.6 |
| 3E | 30% PEEK 10% PS 60% m-T | 291 | 200 | 50 | 64.0–64.2 |
| 3F | 27% PEEK 12% PS 61% m-T | 289 | 200 | 65 | 69.2 |
| 3G | 27% PEEK 12% PS 61% m-T | 288 | 175 | 65 | 69.8 |
| 3H | 30% PEEK 10% PES 60% DPS | 286 | 200 | 75 | 63.2 |

[1]PEEK = VICTREX ® 450G poly(etheretherketone), available from ICI Americas, Inc.
PS = UDEL P1700 polysulfone, available from Amoco Chemicals Corp.
DPS = diphenylsulfone.
m-T = m-Terphenyl.

TABLE IIIB

| Blend[1] Composition (weight percent) | $\left(\dfrac{\text{Nitrogen Flux}}{\text{cm}^2 \text{ sec cmHg}} \text{cm}^3 \text{(STP)}\right)$ | Burst Strength (psi) | Bubble Point Maximum Pore Size (microns) | $\left(\dfrac{\text{Water Flux}}{\text{m}^2 \text{ hr cmHg}} \text{ml}\right)$ |
|---|---|---|---|---|
| 3A | $0.71 \times 10^{-2}$ | 120 | 0.1 | — |
| 3B | $1.4 \times 10^{-2}$–$2.9 \times 10^{-2}$ | 60–120 | — | — |
| 3C | $0.82 \times 10^{-2}$–$1.2 \times 10^{-2}$ | Seam in fiber wall | — | — |
| 3D | $3.1 \times 10^{-2}$–$4.0 \times 10^{-2}$ | >130 | <0.07 | — |
| 3E | $3.6 \times 10^{-2}$–$4.3 \times 10^{-2}$ | — | — | — |
| 3F | $4.9 \times 10^{-2}$ | — | — | — |
| 3G | $4.4 \times 10^{-2}$–$4.7 \times 10^{-2}$ | >100 | 0.1 | 4560 |

TABLE IIIB-continued

| Blend[1] Composition (weight percent) | Nitrogen Flux $\frac{cm^3 \, (STP)}{cm^2 \, sec \, cmHg}$ | Burst Strength (psi) | Bubble Point Maximum Pore Size (microns) | Water Flux $\frac{ml}{m^2 \, hr \, cmHg}$ |
|---|---|---|---|---|
| 3H | $1.1 \times 10^{-2}$ | — | — | — |

[1]PEEK = VICTREX ® 450G poly(etheretherketone), available from ICI Americas, Inc.
PES = VICTREX ® polyethersulfone, available from ICI Americas, Inc.
PS = UDEL P1700 polysulfone, available from Amoco Chemicals Corp.
DPS = diphenylsulfone.
m-T = m-Terphenyl.

What is claimed is:

1. A process for preparing a microporous membrane from an unsulfonate poly(etheretherketone)-type polymer comprising the steps of:
A. forming a mixture comprising:
  (i) at least one unsulfonated poly(etheretherketone)-type polymer,
  (ii) a plasticizer comprising at least one organic compound capable of dissolving at least about 10 weight percent of said poly(etheretherketone)-type polymer at the extrusion or casting temperature, and
  (iii) at least one amorphous polymer which is stable at elevated temperatures, which possesses a glass transition temperature of at least about $-100°$ C., and which is at least partially immiscible in said poly(etheretherketone)-type polymer in the presence of said plasticizer;
B. heating the mixture to a temperature at which said mixture becomes a fluid;
C. extruding or casting said fluid under conditions such that a membrane is formed;
D. quenching or coagulating said membrane by passing said membrane through at least one zone under conditions such that said membrane solidifies; and
E. leaching said membrane by passing said membrane through at least one zone under conditions such that at least a portion of said plasticizer for said poly(etheretherketone)-type polymer, at least a portion of said amorphous polymer, or a combination thereof, is removed from said membrane.

2. The process of claim 1 which comprises the additional step of:
F. before leaching, during leaching, after leaching, or a combination thereof, drawing said membrane to increase the flux of fluid through said membrane, while said membrane is at a temperature above about 25° C. and below the melting point of said poly(etheretherketone)-type polymer or the depressed melting point of said poly(etheretherketone)-type polymer and plasticizer mixture.

3. The process of claim 2 wherein said poly(etheretherketone)-type polymer is selected from the group consisting of poly(etherketone), poly(aryletherketone), poly(etheretherketone), poly(etherketoneketone), poly(etheretheretherketone), poly(etheretherketoneketone), poly(etherketoneetherketoneketone), and mixtures thereof.

4. The process of claim 3 wherein said amorphous polymer is selected from the group consisting of polysulfones; polyethersulfones; styrene copolymers; cellulose esters; ethylene copolymers; amorphous polyesters; amorphous cellulose ethers; polycarbonates; polystyrenes; polysiloxanes; polyacrylates; polymethacrylates; poly(vinylacetates); and polyacrylamides.

5. The process of claim 4 wherein said plasticizer comprises at least one solvent consisting predominantly of carbon and hydrogen and optionally oxygen, nitrogen, sulfur, halogen, and mixtures thereof, wherein said solvent has a molecular weight of between about 160 and about 450, contains at least one six-membered ring structure, and possesses a boiling point of between about 150° C. and about 480° C.

6. The process of claim 5 wherein said plasticizer comprises at least one solvent selected from the group consisting of diphenic acid, N,N-diphenylformamide, benzil, anthracene, 1-phenylnaphthalene, 4-bromobiphenyl, 4-bromodiphenylether, benzophenone, 1-benzyl-2-pyrrolidinone, o,o'-biphenol, phenanthrene, triphenylmethanol, triphenylmethane, triphenylene, 1,2,3-triphenylbenzene, diphenylsulfone, 2,5-diphenyloxazole, 2-biphenylcarboxylic acid, 4-biphenylcarboxylic acid, m-terphenyl, 4-benzoylbiphenyl, 2-benzoylnaphthalene, 3-phenoxybenzyl alcohol, fluoranthene, 2,5-diphenyl-1,3,4-oxadiazole, 9-fluorenone, 1,2-dibenzoylbenzene, dibenzoylmethane, p-terphenyl, 4-phenylphenol, 4,4'-dibromobiphenyl, diphenylphthalate, 2,6-diphenylphenol, phenothiazine, 4,4'-dimethoxybenzophenone, 9,10-diphenylanthracene, pentachlorophenol, pyrene, 9,9'-bifluorene, a mixture of terphenyls, a mixture of partially hydrogenated terphenyls, a mixture of terphenyls and quaterphenyls, 1-phenyl-2-pyrrolidinone, 4,4'-isopropylidenediphenol, 4,4'-dihydroxybenzophenone, quaterphenyl, diphenylterephthalate, 4,4'-dimethyldiphenylsulfone, 3,3'4,4'-tetramethyldiphenylsulfone, and mixtures thereof.

7. The process of claim 6 wherein said plasticizer further comprises at least one non-solvent consisting predominantly of carbon and hydrogen and optionally oxygen, phosphorus, silicon, nitrogen, sulfur, halogen, and mixtures thereof, wherein said non-solvent has a molecular weight of between about 120 and about 455 and possesses a boiling point of between about 150° C. and about 480° C.

8. The process of claim 7 wherein said plasticizer comprises at least one non-solvent selected from the group consisting of 1,3,5-triphenylbenzene, tetraphenylmethane, tetraphenylsilane, diphenylsulfoxide, 1,1-diphenylacetone, 1,3-diphenylacetone, 4-acetylbiphenyl, 4,4'-diphenylbenzophenone, 1-benzoyl-4-piperidone, diphenyl carbonate, bibenzyl, diphenylmethylphosphate, 1-bromonapthalene, 2-phenoxybiphenyl, triphenylphosphate, cyclohexylphenylketone, 1,4-dibenzoylbutane, 2,4,6-trichlorophenol, mineral oil, paraffin oil, petroleum oil, butyl stearate, 9-phenylanthracene, 2-phenylphenol, 1-ethoxynaphthalene, phenylbenzoate, 1-phenyldecane, 1-methoxynaphthalene, 2-methoxynaphthalene, 1,3-diphenoxybenzene, 1,8-dichloroanthraquinone, 9,10-dichloroanthracene, polyphosphoric acid, 1-chloronaphthalene, diphenylether, 1-cyclohexyl-2-pyrrolidinone, hydrogenated terphenyl, dioctylphthalate, 5-chloro-2-benzoxazolone, dibenzothiophene, diphenylsulfide, diphenylchlorophosphate, fluorene, sulfolane, methyl myristate, methyl stearate, hexadecane, dimethyl phthalate, tetraethylene glycol dimethylether, diethylene glycol dibutylether, docosane, eicosane, dotriacontane, 2,7-dimethoxynaphthalene, 2,6-dimethoxynaphthalene, o-terphenyl, 1,1-diphenylethylene, epsilon-caprolactam, thianthrene, silicone oil, and mixtures thereof.

9. The process of claim 8 wherein the amount of poly(etheretherketone)-type polymer in the polymer-plasticizer mixture is between about 10 weight percent and about 90 weight percent.

10. The process of claim 9 wherein the membrane is drawn at a temperature of between about 25° C. and about 360° C.

11. The process of claim 10 wherein said membrane is drawn to a draw ratio of between about 1.1 and about 40.

12. The process of claim 11 wherein said fluid is extruded at a temperature of between about 100° C. and about 400° C.

13. The process of claim 12 wherein said membrane is quenched or coagulated at a temperature of between about 0° C. and about 275° C.

14. The process of claim 13 wherein said quench zone comprises a gaseous environment.

15. The process of claim 14 wherein said membrane is leached at a temperature of between about 0° C. and about 275° C.

16. The process of claim 15 wherein said leach zone comprises a liquid selected from the group consisting of toluene, xylene, acetone, water, an acid or alkali aqueous solution, and chlorinated hydrocarbons.

17. The process of claim 9 wherein said membrane is useful for ultrafiltration, microfiltration, or macrofiltration.

18. The process of claim 17 wherein said membrane possesses a porosity in the range of about 10 percent to about 90 percent.

19. The process of claim 18 wherein the mean pore size of said membrane is in the range of about 5 Angstroms to about 1,000 Angstroms for ultrafiltration, about 0.02 micron to about 10 microns for microfiltration, and about 10 microns to about 50 microns for macrofiltration.

20. The process of claim 19 wherein said membrane possesses a nitrogen flux of at least about $$10^{-6} \frac{cm^3 \ (STP)}{cm^2 \ sec \ cmHg}.$$

21. The process of claim 19 wherein said membrane possesses a water flux of at least about $$1 \frac{ml}{m^2 \ hr \ cmHg}.$$

22. The process of claim 2 which further comprises the additional step of:

G. before leaching, after leaching, before drawing, after drawing, or a combination thereof, annealing said membrane by exposing said membrane to a temperature above the glass transition temperature of the poly(etheretherketone)-type polymer or the poly(etheretherketone)-type polymer and plasticizer mixture and about 10° C. below the melting point of the poly(etheretherketone)-type polymer or depressed melting point of the poly(etheretherketone)-type polymer and plasticizer mixture for a period of time between about 30 seconds and about 24 hours.

23. The process of claim 9 wherein said poly(etheretherketone)-type polymer has a degree of crystallinity of at least about 10 percent and a melting point of at least about 190° C.

* * * * *